(12) United States Patent
Jain et al.

(10) Patent No.: US 10,064,050 B2
(45) Date of Patent: Aug. 28, 2018

(54) MOBILE COMMUNICATION APPARATUS HAVING ANTI-THEFT AND AUTO-NOTIFICATION FUNCTIONS

(71) Applicant: MediaTek Inc, Hsin-Chu (TW)

(72) Inventors: Anku Jain, Gurgoan (IN); Amit Kumar, Meerut (IN); Guan-Hua Tu, Taipei (TW)

(73) Assignee: MEDIATEK INC, Hsin-Chu (TW)

( * ) Notice: Subject to any disclaimer, the term of this patent is extended or adjusted under 35 U.S.C. 154(b) by 13 days.

(21) Appl. No.: 14/962,613

(22) Filed: Dec. 8, 2015

(65) Prior Publication Data

US 2016/0094987 A1 Mar. 31, 2016

Related U.S. Application Data

(60) Continuation of application No. 12/773,169, filed on May 4, 2010, now Pat. No. 9,241,058, which is a (Continued)

(51) Int. Cl.
*H04W 12/12* (2009.01)
*H04W 12/08* (2009.01)
(Continued)

(52) U.S. Cl.
CPC ............ *H04W 12/02* (2013.01); *H04M 1/66* (2013.01); *H04W 8/183* (2013.01); *H04W 8/20* (2013.01);
(Continued)

(58) Field of Classification Search
CPC ..... H04W 12/06; H04W 12/12; H04W 12/02; H04W 88/02; H04W 12/08; H04W 60/00;
(Continued)

(56) References Cited

U.S. PATENT DOCUMENTS 4,882,474 A 11/1989 Anderi et al.
5,444,764 A 8/1995 Galecki
(Continued)

FOREIGN PATENT DOCUMENTS

CN 1395407 2/2003
CN 1407787 4/2003
(Continued)

OTHER PUBLICATIONS

What's My ICCID; http://my3.three.co.uk/mysecurity/iccid.do; 2 pages.

*Primary Examiner* — Olumide T Ajibade Akonai
(74) *Attorney, Agent, or Firm* — McClure, Qualey & Rodack, LLP

(57) ABSTRACT

A mobile communication apparatus comprises an anti-theft control circuit and a transmission control circuit. The anti-theft control circuit has an information management module and a security module. The information management module is used for storing a user personal database comprising at least one of a phonebook database, a schedule database, and an e-mail database. The transmission control circuit is used for transmitting data and/or signals. When the transmission control circuit receives a remote message, the security module examines whether the remote message is a predetermined legitimate remote control message; wherein if YES, the transmission control circuit sends out at least one record of the phonebook database, the schedule database, and the e-mail database to an electronic apparatus indicated by the remote message.

6 Claims, 5 Drawing Sheets

Related U.S. Application Data division of application No. 11/609,390, filed on Dec. 12, 2006, now Pat. No. 9,160,830, which is a continuation-in-part of application No. 11/189,151, filed on Jul. 25, 2005, now Pat. No. 7,574,235.

(51) Int. Cl.

| | | |
|---|---|---|
| *H04W 12/06* | (2009.01) | |
| *H04W 12/02* | (2009.01) | |
| *H04W 8/20* | (2009.01) | |
| *H04M 1/66* | (2006.01) | |
| *H04W 8/18* | (2009.01) | |
| *H04W 72/04* | (2009.01) | |
| *H04W 88/02* | (2009.01) | |

(52) U.S. Cl.
CPC ......... *H04W 12/06* (2013.01); *H04W 72/048* (2013.01); *H04W 12/08* (2013.01); *H04W 12/12* (2013.01); *H04W 88/02* (2013.01)

(58) Field of Classification Search
CPC ....... H04W 76/02; H04W 8/06; H04W 8/183; H04W 8/04; H04W 8/20; H04W 4/12; H04W 4/14; H04L 63/0428; H04L 2209/80; H04L 9/3226; H04L 63/083; G06F 21/606; G06F 21/35; G06F 21/43; G06F 21/6254; G06F 21/602; G06F 21/6218; G06F 21/6245; G06F 21/88; G06F 2221/2107; G06F 2221/2113; G06F 2221/2143; G06F 63/0428
USPC .................................. 455/410, 411
See application file for complete search history.

(56) References Cited

U.S. PATENT DOCUMENTS

| | | | |
|---|---|---|---|
| 5,600,708 A | 2/1997 | Meche et al. | |
| 5,734,978 A | 3/1998 | Hayatake et al. | |
| 5,742,910 A | 4/1998 | Gallant et al. | |
| 5,850,594 A * | 12/1998 | Cannon | H04W 88/023 340/4.3 |
| 5,862,472 A | 1/1999 | Park | |
| 5,898,783 A | 4/1999 | Rohrbach | |
| 5,933,773 A | 8/1999 | Barvesten | |
| 5,940,773 A | 8/1999 | Barvesten | |
| 6,052,604 A | 4/2000 | Bishop et al. | |
| 6,591,103 B1 | 7/2003 | Dunn et al. | |
| 6,662,023 B1 | 12/2003 | Helle | |
| 6,741,851 B1 | 5/2004 | Lee et al. | |
| 7,054,624 B2 | 5/2006 | Cocita | |
| 7,099,699 B2 | 8/2006 | Jeong | |
| 7,103,367 B2 | 9/2006 | Adams et al. | |
| 7,783,281 B1 | 8/2010 | Cook et al. | |
| 2002/0142805 A1 | 10/2002 | Pecen et al. | |
| 2003/0181219 A1 | 9/2003 | Huang | |
| 2003/0182232 A1* | 9/2003 | Zeltzer | G06F 17/30575 705/51 |
| 2004/0006655 A1* | 1/2004 | Toffolet | H04M 1/673 710/1 |
| 2004/0110488 A1 | 6/2004 | Komsi | |
| 2004/0203923 A1 | 10/2004 | Mullen | |
| 2005/0066199 A1 | 3/2005 | Lin | |
| 2005/0164738 A1 | 7/2005 | Liu | |
| 2005/0221799 A1 | 10/2005 | Tervo et al. | |
| 2005/0227678 A1 | 10/2005 | Agrawal et al. | |
| 2006/0095331 A1 | 5/2006 | O'Malley | |
| 2006/0105810 A1 | 5/2006 | Gnuschke | |
| 2006/0276172 A1 | 12/2006 | Rydgren et al. | |
| 2006/0281407 A1 | 12/2006 | Deeds | |
| 2007/0056043 A1* | 3/2007 | Onyon | G06F 21/88 726/26 |
| 2007/0167176 A1 | 7/2007 | Heikkinen | |
| 2008/0167036 A1* | 7/2008 | Bush | H04W 8/22 455/435.1 |
| 2009/0082023 A1 | 3/2009 | Gustavsson | |

FOREIGN PATENT DOCUMENTS

| | | |
|---|---|---|
| CN | 1471289 | 1/2004 |
| TW | 529271 | 4/2003 |
| WO | WO 9526115 | 9/1995 |
| WO | WO 0269657 | 9/2002 |

* cited by examiner

MOBILE COMMUNICATION APPARATUS HAVING ANTI-THEFT AND AUTO-NOTIFICATION FUNCTIONS

CROSS REFERENCE TO RELATED APPLICATIONS

This application is a Continuation of pending U.S. patent application Ser. No. 12/773,169, filed May 4, 2010, now U.S. Pat. No. 9,241,058, which is a Divisional of U.S. patent application Ser. No. 11/609,390, filed on Dec. 12, 2006 (now U.S. Pat. No. 9,160,830, issued on Oct. 13, 2015), which is a continuation-in-part application of application Ser. No. 11/189,151 filed on Jul. 25, 2005 (now U.S. Pat. No. 7,574,235, issued on Aug. 11, 2009), the entirety of which are incorporated by reference herein.

BACKGROUND

Field of the Invention

The invention relates to a mobile communication apparatus and, more particularly, to a mobile communication apparatus having anti-theft and auto-notification functions.

Description of the Prior Art

As the continuous development of technology, mobile communication apparatuses have become more and more multi-functional and expensive. When users lose their mobile communication apparatuses, it will cause them a lot of inconvenience and financial lost.

The mobile communication apparatus has a unique international mobile equipment identity (IMEI) to identification. When the mobile communication apparatus is lost, the position of the lost mobile communication apparatus can be traced via the IMEI-trace procedure provided by the TSP (Telecom service provider). However, if the original SIM (Subscriber identification module) card of the lost mobile communication apparatus is replaced, the TSP for the original SIM card will not be able to trace the position of the mobile communication apparatus via the IMEI-trace procedure. The owner can still find the position of the mobile communication apparatus by asking all the TSPs to perform the IMEI-trace procedure, but it is too expensive. However, if the lost mobile communication apparatus is taken overseas, it is impossible to find it back.

Some well-known mobile communication apparatus has GPS (global position system) facility installed, and the position of the lost mobile communication apparatus can be traced via the GPS. However, the cost of installing GPS facility is too high to aim the GPS facility at finding the lost mobile communication apparatus.

Some mobile communication apparatus of the prior art has some security function. For example, each SIM card has a PIN (personal identification number) as a password, and each mobile communication apparatus has several kinds of security codes for preventing the lost mobile communication apparatus from being misused and/or preventing the important information stored inside from being stolen. However, it will be impossible for the owner to find the lost mobile communication apparatus via the mentioned security function.

In the mobile communication apparatus disclosed in U.S. Pat. No. 6,662,023, if it is not normally started (e.g. the wrong security code is entered), it will display the information about the owner of the mobile communication apparatus on the interface. Besides, the owner can also use remote control, such as short messages, to control the security settings of the lost mobile communication apparatus. However, if the SIM card of the lost mobile communication apparatus is replaced, the owner will have no idea about the new phone number of the lost mobile communication apparatus so that it is impossible for the owner to send the short messages to the lost mobile communication apparatus for security settings. Namely, the remote control function cannot be performed.

Hence, the main objective of the present invention is to provide a mobile communication apparatus which has anti-theft and auto-notification functions to solve the above problems.

SUMMARY

One objective of the present invention is to provide a mobile communication apparatus that has anti-theft and auto-notification functions and a method of signal detection and notification for the apparatus that can help the owner find the lost mobile communication apparatus.

Another objective of the present invention is to provide a mobile communication apparatus that has anti-theft and auto-notification functions; it also provides a method of signal detection and notification for the apparatus that can retrieve and send information about the user of the new substitute SIM card to the original owner when the mobile communication apparatus is lost and the SIM card of the mobile communication apparatus is replaced. The original owner can use the new communication number to set and trace the lost mobile communication apparatus.

Another objective of the present invention is to provide a mobile communication apparatus that has anti-theft and auto-notification functions; it also provides a method of signal detection and notification for the apparatus that can start the security functions to protect the original owner's personal data and to further send that personal data to the original owner.

Another objective of the present invention is to provide a mobile communication apparatus that has anti-theft and auto-notification functions and a method for information security for the apparatus that can make the original owner remotely change the security setting when the mobile communication apparatus is lost.

The mobile communication apparatus of the present invention that has anti-theft and auto-notification functions comprises a first SIM card, a transmission control circuit, and an anti-theft control circuit. The first SIM card is configured to be engaged with the mobile communication apparatus, and it has corresponding first identification information. The transmission control circuit is used to send data or/and signal.

The anti-theft control circuit comprises a SIM-card-detection module and a subscriber information management module. The SIM-card-detection module is used to detect whether the first SIM card (i.e. the original SIM card) is replaced by a second SIM card (i.e. the substitute SIM card), and to generates a corresponding detection result. The subscriber information management module is used to store the corresponding first identification information of the first SIM card and contact information. When the SIM-card-detection module generates the detection result, the transmission control circuit will send a notice signal to the original owner according to the contact information stored in the subscriber information management module.

The mobile communication apparatus of the present invention that has anti-theft and auto-notification functions also comprises a security module. The security module comprises/provides a plurality of data security classes for setting and stores a third security code for protecting the data in the user's (original owner's) personal database correspondingly. When the transmission control circuit receives a remote message, the security module will determine whether the remote message is a predetermined legitimate remote control message according to the third security code. If YES, the data in the user's personal database is protected correspondingly by performing a data security procedure according to the remote control message.

The method of the present invention for signal detection and notification applied in a mobile communication apparatus comprises the following steps. To begin with, a first SIM card is provided to be coupled to the mobile communication apparatus, and the first SIM card comprises corresponding first identification information. Next, the first identification information corresponding to the first SIM card and predetermined contact information are stored in the mobile communication apparatus. Then, it is detected whether the first SIM card is replaced by a second SIM card, and a corresponding detection result is generated. If a detection result is generated by the SIM-card-detection module, a notice signal will be sent to the user (the original owner) according to the predetermined contact information.

The method of the present invention applied in a mobile communication apparatus comprises the following steps. A plurality of data security classes are provided in the mobile communication apparatus for setting, and a third security code is provided for protecting the data in the user's (original owner's) personal database correspondingly. When a remote message is received by the mobile communication apparatus, the remote message is examined by using the third security code. After the remote message is confirmed to be the predetermined legitimate remote control message, the data in the user's personal database is protected correspondingly by performing a data security procedure according to the remote message.

The mobile communication apparatus of the present invention comprises an anti-theft control circuit and a transmission control circuit. The anti-theft control circuit has an information management module and a security module. The information management module is used for storing a user personal database comprising at least one of a phonebook database, a schedule database, and an e-mail database. The transmission control circuit is used for transmitting data and/or signals. When the transmission control circuit receives a remote message, the security module examines whether the remote message is a predetermined legitimate remote control message; wherein if YES, the transmission control circuit sends out at least one record of the phonebook database, the schedule database, and the e-mail database to an electronic apparatus indicated by the remote message.

The method for protecting personal data of the present invention applied in a mobile communication apparatus comprises the following steps. At least one of a phonebook database, a schedule database, or an e-mail database, which is stored in an information management module of the mobile communication apparatus is provided. A remote message is received and examined. At least one record of the phonebook database, the schedule database, and the e-mail database is sent out to an electronic apparatus indicated by the remote message when the remote message is the predetermined legitimate remote control message.

The method for protecting personal data of the present invention applied in a mobile communication apparatus, the method comprises the following steps. A user personal database is provided. The user personal database comprises at least one of a phonebook database, a schedule database, and an e-mail database, which is stored in the mobile communication apparatus. At least one record of the phonebook database, the schedule database, or the e-mail database is deleted when it's detected that a first SIM card is replaced by a second SIM card by the SIM-card-detection module.

The method for protecting personal data of the present invention applied in a mobile communication apparatus comprises the following steps. At least one of a phonebook database, a schedule database, or an e-mail database, which is stored in an information management module of the mobile communication apparatus is provided. A remote message is received and examined. At least one record of the phonebook database, the schedule database, and the e-mail database is deleted when the remote message is a predetermined legitimate remote control message.

The method for protecting personal data of the present invention applied in a mobile communication apparatus, the method comprises the following steps. A user personal database is provided. The user personal database comprises at least one of a phonebook database, a schedule database, and an e-mail database, which is stored in the mobile communication apparatus. At least one record of the phonebook database, the schedule database, or the e-mail database is locked up or encrypted when it's detected that a first SIM card is replaced by a second SIM card by the mobile communication apparatus.

The method for protecting personal data of the present invention applied in a mobile communication apparatus comprises the following steps. At least one of a phonebook database, a schedule database, or an e-mail database, which is stored in an information management module of the mobile communication apparatus is provided. A remote message is received and examined. At least one record of the phonebook database, the schedule database, and the e-mail database is locked up or encrypted when the remote message is a predetermined legitimate remote control message.

Hence, the present invention is provided not only to effectively secure/protect the data stored in the mobile communication apparatus when the mobile communication is lost, but also to remotely control the setting of the lost mobile communication apparatus. Besides, when the original SIM card is replaced, user information of the substitute SIM card can be sent to the original owner via various transmission methods so that the original owner can continuously trace and set the lost mobile communication apparatus by using a new communication number provided in that user information. This helps the original owner to find back the lost mobile communication apparatus.

The advantage and spirit of the invention could be better understood by the following recitations together with the appended drawings.

DESCRIPTION OF THE DRAWINGS

The invention can be more fully understood by reading the subsequent detailed description and examples with references made to the accompanying drawings, wherein.

DETAILED DESCRIPTION

Figure 1:
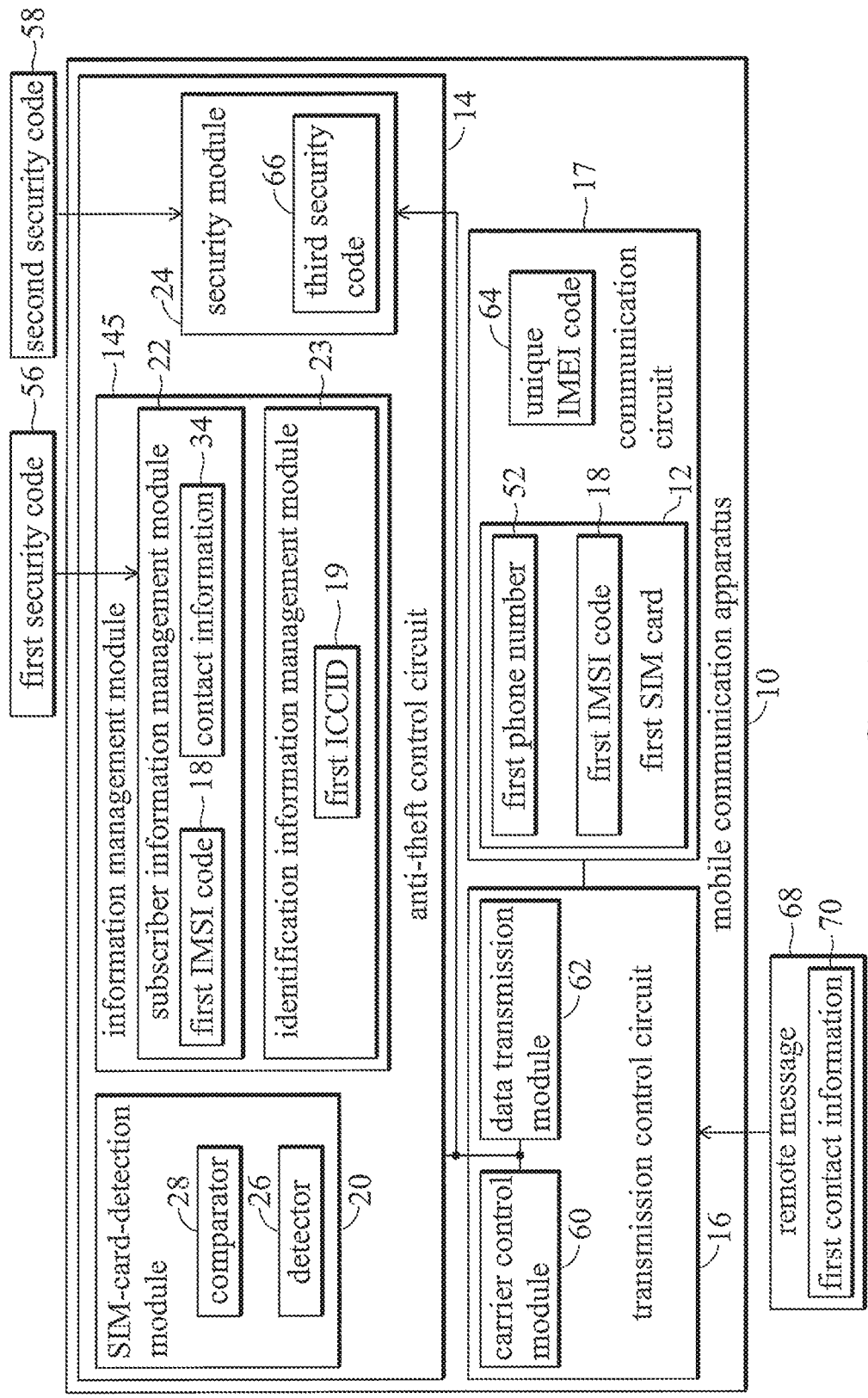
FIG. 1 is a function block diagram illustrating a mobile communication apparatus according to a preferred embodiment of the invention.
Figure 2:
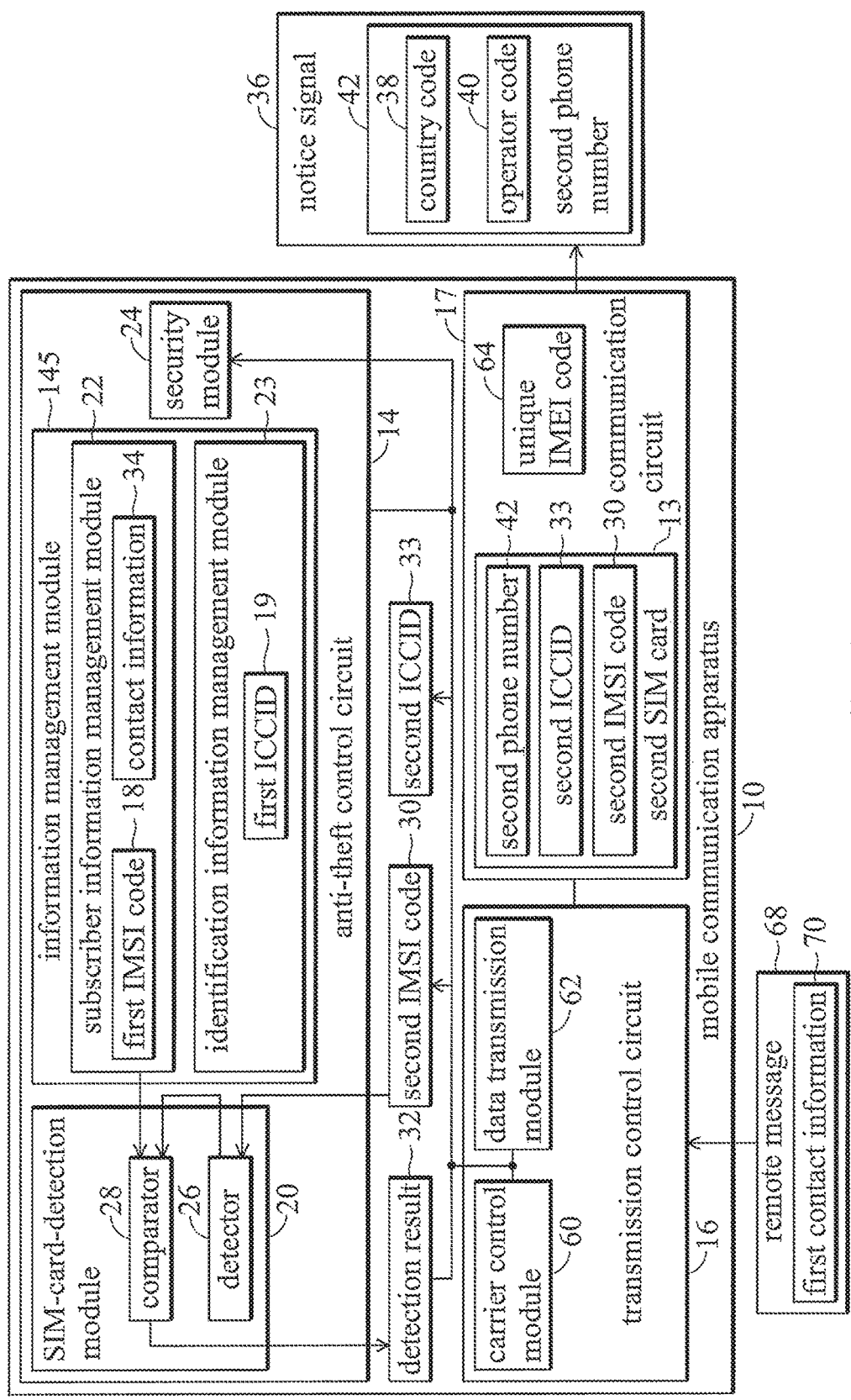
FIG. 2 is a function block diagram illustrating the mobile communication apparatus of FIG. 1 when its original SIM card being replaced by a second SIM card.

Please refer to FIG. 1 and FIG. 2. FIG. 1 is a function block diagram illustrating a mobile communication apparatus 10 according to a preferred embodiment of the present invention. FIG. 2 is a function block diagram illustrating the mobile communication apparatus 10 shown in FIG. 1 when its SIM card 12 being replaced by a second SIM card 13. As shown in FIG. 1, the mobile communication apparatus 10 of the invention comprises a first SIM card 12, an anti-theft control circuit 14, a transmission control circuit 16, and a communication circuit 17. The mobile communication apparatus 10 has a unique international mobile equipment identity (unique IMEI) 64 for identification. The anti-theft control circuit 14 comprises a SIM-card-detection module 20, an information management module 145, and a security module 24. The information management module 145 comprises a subscriber information management module 22 and an identification information management module 23.

The first SIM card 12 is coupled to the mobile communication apparatus 10, and it comprises a corresponding first international mobile subscriber identity (IMSI) code 18, a first Integrated Circuit Card Identification (ICCID) 19, and a corresponding first phone number 52. The first SIM card 12 is placed in the mobile communication apparatus 10 and is connected with the communication circuit 17.

The IMSI is a 15-digit, non-dialable number used to provide each digital cellular subscriber with a unique identification number. The IMSI is a unique number that is associated with mobile phone users within a network system such as GSM and UMTS (Universal Mobile Telecommunications System). The IMSI is sent by the mobile phone to the network and is also used to acquire other details of the mobile in the Home Location Register (HLR) or as locally copied in the Visitor Location Register.

The ICCID is a 19-digit number physically printed on the SIM card. Each SIM card is uniquely identified by its ICCID.

The communication circuit 17 is configured to form a communication linkage. The transmission control circuit 16 is configured to transfer data and/or signal.

The SIM-card-detection module 20 is configured to detect whether the first SIM card 12 is replaced by the second SIM card 13 according to the IMSI code 18 and/or the ICCID 19, and to generate a corresponding detection result. The SIM-card-detection module 20 comprises a detector 26 and a comparator 28. The subscriber information management module 22 is used to store the first international mobile subscriber identity (IMSI) code 18 corresponding to the first SIM card 12 and to store predetermined contact information 34.

The identification information management module 23 is used to store the first ICCID 19 corresponding to the first SIM card 12.

Please refer to FIG. 2. The detector 26 is used to detect the second SIM card 13 currently coupled to the mobile communication apparatus 10, so as to get a corresponding second IMSI code 30 and/or a second ICCID 33. The comparator 28 is used to compare the second IMSI 30 with the first IMSI code 18 stored in the subscriber information management module 22. The comparator 28 can also compares the second ICCID 33 with the first ICCID 19 stored in the identification information management module 23. If it is determined that the second IMSI 30 is different from the first IMSI 18, or the second ICCID 33 is different from the first ICCID 19, the SIM-card-detection module 20 will generate a corresponding detection result 32. In the mobile communication apparatus 10 shown in FIG. 2, because the first SIM card 12 is replaced by the second SIM card 13, the SIM-card-detection module 20 will detect that replacement, and generate a corresponding detection result 32. When the SIM-card-detection module 20 generates the detection result 32, the transmission control circuit 16 will send a short message according to the predetermined contact information 34 in the subscriber management module 22. At this time, the TSP will automatically add a notice signal 36 into the short message. In other words, when the mobile communication apparatus 10 detects that the first SIM card 12 is replaced by the second SIM card 13, the mobile communication apparatus 10 will send a short message according to the predetermined contact information 34, and the TSP of the second SIM card 13 will add the phone number of the second SIM card 13 into the short message.

The second SIM card 13 has a corresponding second phone number 42, and the notice signal 36 comprises the corresponding second phone number 42 of the second SIM card 13, wherein the second telephone number 42 further comprises a country code 38 and an operator code 40. Suppose the second phone number 42 is "+886928xxxx", then the country code 38 is "+886" which represents Taiwan; the operator code 40 is "928" which represents Chung-Hwa Telecom, a communication service provider in Taiwan. Particularly, when the TSP of the second SIM card 13 and that of the first SIM card 12 are in the same country, the second phone number 42 may not show the country code 38.

Figure 3:
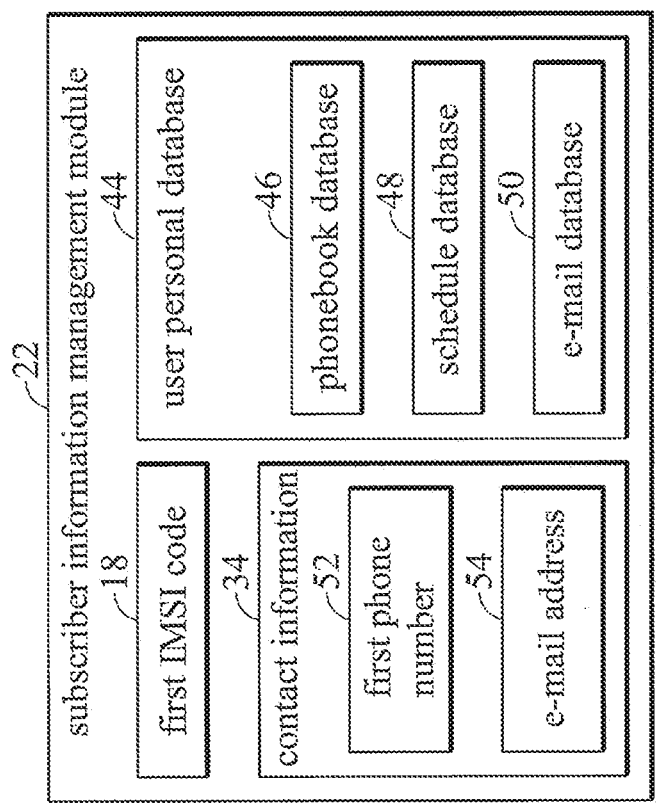
FIG. 3 is a schematic diagram illustrating the subscriber information management module as illustrated in FIG. 1.

Please refer to FIG. 3. FIG. 3 is a schematic diagram illustrating the subscriber information management module as illustrated in FIG. 1. In the mobile communication apparatus 10, the subscriber information management module 22 stores the first IMSI code 18 and contact information 34. According to a preferred embodiment of the invention, the contact information 34 may be an e-mail address 54 and/or a corresponding first phone number 52 to be stored in the subscriber information management module 22 in advance. The predetermined contact information 34 can comprise both of the e-mail address 54 and the first phone number 52, or one of them. According to different embodiments of the invention, the contact information 34 can be the e-mail address 54 or/and the first phone number 52, and the notice signal 36 is transmitted to the predetermined e-mail address 54 or/and the first phone number 52.

If the mobile communication apparatus 10 is lost and the first SIM card 12 is replaced by the second SIM card 13, the mobile communication apparatus 10 will send a short message having the notice signal 36 automatically added by the TSP of the second SIM card 13 to the original owner according to the predetermined contact information designated by the owner, such as a telephone number and/or an e-mail address. In other words, when the original owner receives the phone call and/or the e-mail, the owner will know the related information of the second SIM card 13. Therefore, the original owner can trace the mobile communication apparatus 10 by that information.

As shown in FIG. 3, the subscriber management module 22 also has a user personal database 44. According to the embodiment of the invention, the user's personal database 44 includes a phonebook database 46, a schedule database 48, an e-mail database 50, or other kinds of database. According to an embodiment of the invention, the predetermined contact information is the e-mail address 54. The transmission control circuit 16 will send an e-mail which includes the notice signal 36 to the e-mail address 54. If the substitute second SIM card 13 has the e-mail service provided by the TSP, the original owner can obtain the second phone number 42 via the sender of the e-mail. For example, the sender's address of the e-mail which includes the notice signal 36 will be presented as 0928xxxxxx@emomo.net.tw, wherein 0928xxxxxx is the second phone number 42. If the substitute second SIM card 13 does not use the e-mail service provided by the TSP, the notice signal 36 sent to the e-mail address 54 will only comprise the second IMSI code 30. However, the original owner can still obtain the country code 38 and the operator code 40 of the second SIM card 13 via the second IMSI code 30. According to the embodiment of the invention, the transmission control circuit 16 will further transmit the data in the user's personal database 44 to the e-mail address to be received by an electronic apparatus (not shown).

In some embodiment of the invention, when the mobile communication apparatus 10 is lost and the first SIM card 12 of the mobile communication apparatus 10 is replaced by the second SIM card 13, the SIM-card-detection module 20 will detect the replacement, and then the transmission control circuit 16 will send an e-mail according to the e-mail address 54 and will also transmit the data in the user's personal database 44 to the e-mail address 54 to be received by the computer system for storing. Therefore, even if the original owner cannot find back the lost mobile communication apparatus 10, the original owner can get back the phonebook records, schedule records etc in the user's personal database 44 stored in the lost mobile communication apparatus 10 via the mentioned data transmission.

In some embodiment of the invention, the predetermined contact information is the first phone number 52. When the SIM-card-detection module 20 generates the detection result 32 and transmits the detection result 32 to the security module 24, the security module 24 will notify the transmission control circuit 16. The transmission control circuit 16 will dial the first phone number 52 via the communication circuit 17, and the notice signal 36 will be automatically sent via the TSP. The notice signal 36 includes a second phone number 42. The second phone number 42 further comprises the country code 38 and the operator code 40. However, the user can disable the function of sending phone number for hiding the second phone number 42 while using the mobile communication apparatus 10. Under this situation, the security module 24 will enable/activate the function of sending phone number first, and then notify the transmission control circuit 16 to dial the first phone number 52 via the communication circuit 17, so as to send out the notice signal 36 that includes the second phone number 42.

When a subscriber (i.e. the original owner) wants to edit and/or to modify the predetermined contact information 34 in the subscriber information management module 22, a first security code must be correctly inputted. The first security code 56 is set by the subscriber and is stored in advance in the mobile communication apparatus 10. After the input first security code 56 is confirmed to be correct, the corresponding IMSI code of the SIM card currently coupled to the mobile communication apparatus 10 will be stored in the subscriber information management module 22.

The security module 24 has a plurality of data security classes for setting. When a subscriber (i.e. the original owner) wants to set and/or to modify the data security class of the mobile communication apparatus 10, a second security code 58 must be correctly inputted. Only when the input second security code is confirmed to be correct, the subscriber is allowed to set and/or to modify the data security class of the mobile communication apparatus 10. Besides, the user can disable the function of the anti-theft control circuit 14 by entering the second security code 58. In some embodiment of the present invention, the security module 24 provides four data security classes for user (i.e. subscriber) selection and setting. The four data security classes and their corresponding security actions are listed in table 1.

TABLE 1

| Data Security Class | Security Actions |
|---|---|
| Class 3 | Sending out the notice signal to the predetermined contact information, locking and encrypting all data in the user's personal database stored in the subscriber information management module, and sending all of that data to the predetermined contact information |
| Class 2 | Sending out the notice signal to the predetermined contact information, locking and encrypting all data in the user's personal database stored in the subscriber information management module |
| Class 1 | Locking and encrypting all data in the user's personal database stored in the subscriber information management module |
| Class 0 | Doing nothing relating to data security |

In some embodiment of the present invention, when the data security class of the mobile communication apparatus 10 is set to be Class 3 and is activated, all of the data in the user's personal database will be transmitted to the original owner. The data in the phonebook database 46 is packaged in the form of a virtual business card (vCard) for transmission, while the data in the schedule database 48 is packaged in the form of a virtual calendar (vCalendar) for transmission. In other words, when the data security class 3 is activated, the owner will receive the data in the form of a vCard, a vCalendar and e-mails, and can easily store the vCard, the vCalendar, and the e-mails (i.e. the data) into another mobile communication apparatus, such as a mobile phone, or other electronic apparatus, such as a personal computer, a Personal Digital Assistant (PDA).

When the security module 24 receives the detection result 32, a data security procedure in the data security module 24 is activated, and the user's personal database 44 is protected and secured according to the set data security class. After sending out the notice signal 36, the security module 24 will wait for a confirmation signal for confirming that the notice signal 36 has been successfully transmitted to the predetermined contact information 34. If the security module 24 does not receive the confirmation signal in a predetermined period, it will send out the notice signal 36 again until the confirmation signal is received.

During and after the transmission control circuit 16 transmits the data in the user's personal database 44 to the predetermined contact information 34, the security module 24 will avoid displaying any information related to that data transmission. Furthermore, it will delete all of the records related to that data transmission. Similarly, no information related to the notice signal transmission and the confirmation signal reception will be displayed and recorded.

When the mobile communication apparatus 10 is lost, the data in the user's personal database 44 of the mobile communication apparatus 10 not only can be sent back to the original owner, but also any information related to that data transmission will not be displayed or recorded, neither the notice signal transmission and the confirmation signal reception. Namely, the data security procedure, including the notice signal transmission, data locking, encryption and transmission, is performed in secret. Therefore, even if the lost mobile communication apparatus 10 is taken by others, the performing of the data security procedure will not be known. Furthermore, by applying the functions of signal detection and notification mentioned above, it is more possible for the original owner to find back the lost mobile communication apparatus 10.

As shown in FIG. 1, the transmission control circuit 16 includes a carrier control module 60 and a data transmission module 62. The carrier control module 60 will select one available carrier from a plurality of carriers according to the size of the data to be transmitted for data transmission. The transmission carrier is provided in a communication system, such as a Global System for Mobile communications (GSM), a general packet radio service (GPRS), Enhanced Data rates for GSM Evolution (EDGE), a wCDMA, and a CDMA2000.

The data transmission module 62 will select a corresponding data transmission application program according to the selected transmission carrier for the data transmission. In the embodiment shown in FIG. 4, the data transmission application program may be an e-mail application, a short message service (SMS) application, and a multimedia message service (MMS) application.

The invention also provides a method for signal detection and notification to be applied in a mobile communication apparatus. The mobile communication apparatus is coupled to the first SIM card, and stores a first IMSI and first ICCID corresponding to the first SIM card and predetermined contact information. In the signal detection and notification method for the mobile communication apparatus of the invention, it will be detected whether the first SIM card is replaced by the second SIM card, and a corresponding detection result will be generated. Then, a short message having the notice signal automatically added by the TSP is sent to the predetermined contact information.

Figure 4:
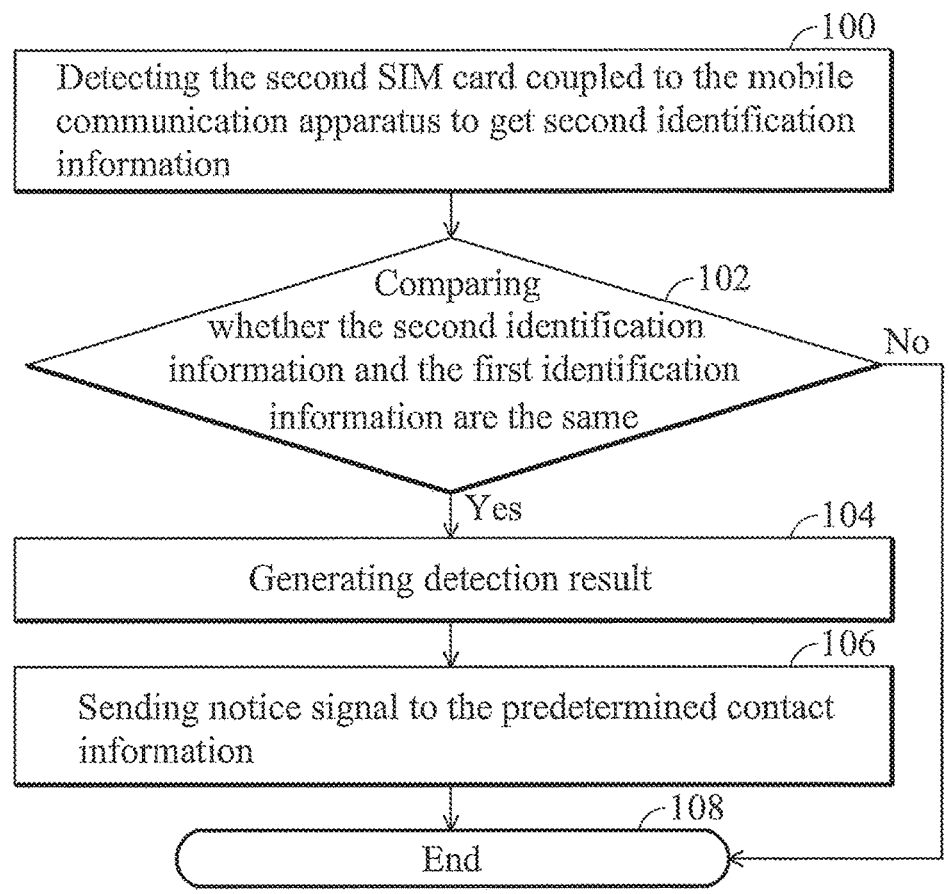
FIG. 4 is a flowchart illustrating the method of signal detection and notification for the mobile communication apparatus according to a preferred embodiment of the invention.

Please refer to FIG. 4. FIG. 4 is a flowchart illustrating the method of signal detection and notification for the mobile communication apparatus according to a preferred embodiment of the invention. Please refer to FIG. 4, FIG. 1 and FIG. 2, the flowchart of the method for detecting whether the first SIM card 12 is replaced by the second SIM card 13 and the flowchart of sending the notice signal 36 are demonstrated. In the embodiment, the first IMSI 18 and/or ICCID 19 corresponding to the first SIM card 12 and the predetermined contact information 34 are pre-stored in the mobile communication apparatus 10. According to the present invention, the method to detect whether the first SIM card is replaced by the second SIM card in the mobile communication apparatus 10 comprises the steps below:

Step 100: Detecting the second SIM card 13 currently engaged with the mobile communication apparatus 10, and then obtaining a corresponding second IMSI 30 and/or second ICCID 33.

Step 102: Comparing the second IMSI 30 with the first IMSI 18 stored in the subscriber information management module 22 to identify whether the second IMSI 30 and the first IMSI 18 are the same, and/or comparing the second ICCID 33 with the first ICCID 19 stored in the identification information management module 23 to identify whether the second ICCID 33 and the first ICCID 19 are the same. If yes, go to step 108; if not, go to step 104.

Step 104: Generating detection result 32 which represents the second IMSI 30 is different from the IMSI 18 and/or second ICCID 33 is different from the ICCID 19.

Step 106: Sending the notice signal 36 to the predetermined contact information 34.

Step 108: End.

Please refer to FIG. 1. The security mechanism of the mobile communication apparatus 10 is further described as follows. The security module 24 not only can achieve the above functions but also execute other security functions. The security module 24 not only has a plurality of data security classes for setting, but also stores a third security code 66 for protecting the data in the user's personal database 44. When the transmission control circuit 16 receives a remote message 68, the security module 24 examines whether the remote message 68 is a predetermined legitimate remote control message according to the third security code. If YES, the data in the user's personal database 44 is protected correspondingly according to the remote message 68.

The remote message 68 is sent by a remote electronic apparatus (not shown). The electronic apparatus comprises an interface program to receive an inputted fourth security code, and the electronic apparatus will use the fourth security code to compile and/or encode the remote message 68 to be the predetermined legitimate remote control message. After receiving the remote message 68, the security module 24 will use the stored third security code 66 to decompile/decode the remote message 68. If the fourth security code (not shown) and the third security code 66 are the same, the remote message 68 can be successfully decoded and be identified to be the predetermined legal remote control message. After recognizing the remote message as the predetermined legal remote control message, the data in the user's personal database 44 is secured according to the remote message 68.

In some embodiment of the invention, the electronic apparatus sending the remote message 68 is another mobile communication apparatus. In this embodiment of the invention, when the original owner of the mobile communication apparatus 10 loses the mobile communication apparatus 10, the original owner can use another mobile communication apparatus to send a short message as a remote message 68 for remotely controlling the lost apparatus 10. After the mobile communication apparatus 10 receives the remote message 68, it will use the stored third security code 66 to decode the remote message 68. After the remote message 68 is confirmed to be a predetermined legitimate remote control message, the data in the user's personal database 44 is correspondingly secured according to the remote message 68. In this embodiment, the following actions/operations for data security may be performed according to the remote message 68: changing/setting the security class, locking all of the personal data from being accessed/modified/detected, modifying the phone numbers and e-mail addresses stored in the contact information, and changing the security code(s).

The remote message 68 comprises a first contact information 70 inputted via the interface program of the electronic apparatus. The security module 24 will set/modify the security actions corresponding to each of the data security classes according to the first contact information 70, as shown in Table 2.

TABLE 2

| Data Security Class | Security Actions |
| --- | --- |
| Class 3 | Sending a notice signal to the first contact information, locking and encrypting all data in the user's personal database stored in the subscriber information management module, and sending all the data to the first contact information |
| Class 2 | Sending a notice signal to the first contact information, locking and encrypting all data in the user's personal database stored in the subscriber information management module |
| Class 1 | Locking and encrypting all data in the user's personal database stored in the subscriber information management module |
| Class 0 | Doing nothing |

The subscriber data management module 22 may further store other predetermined second contact information. In some embodiment, the second contact information is the predetermined contact information 34 pre-stored in the subscriber data management module 22. The security module 24 will then set/modify the security actions corresponding to each of the data security classes according to the second contact information, as shown in Table 3.

TABLE 3

| Data Security Class | Security Actions |
| --- | --- |
| Class 3 | Sending out the notice signal to the second contact information, locking and encrypting all data in the user's personal database stored in the subscriber information management module, and sending all the data to the second contact information |
| Class 2 | Sending out the notice signal to the second contact information, locking and encrypting all data in the user's personal database stored in the subscriber information management module |
| Class 1 | Locking and encrypting all data in the user's personal database stored in the subscriber information management module |
| Class 0 | Doing nothing |

The mobile communication apparatus 10 comprises a display panel (not shown). According to some embodiment of the invention, the remote message 68 received by the transmission control circuit 16 is a short message. If the security module 24 recognizes the remote control short message as a predetermined legal remote control message, the remote control short message will not be displayed on the display panel, so as to prevent the current user, probably an illegal user, of the lost mobile communication apparatus from being aware of the existence of the remote control short message.

Figure 5:
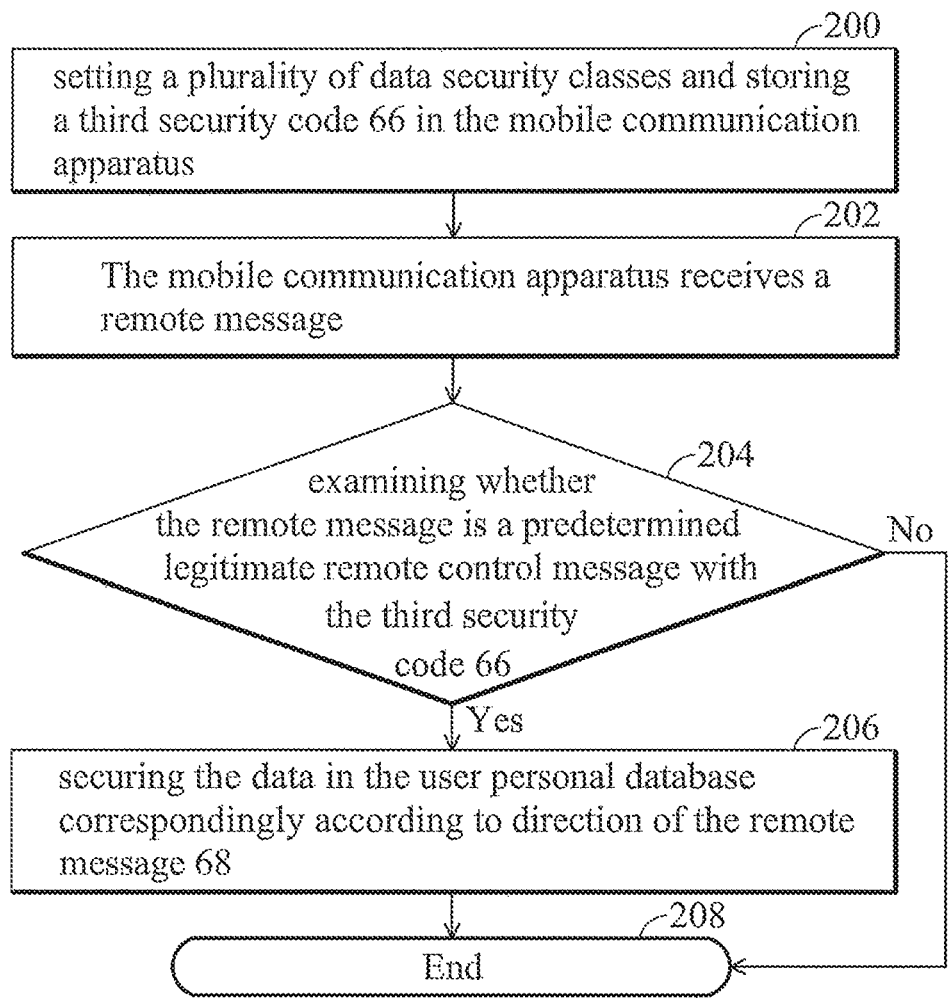
FIG. 5 is a flowchart illustrating the data security method for the mobile communication apparatus according to a preferred embodiment of the invention.

Please refer to FIG. 5. FIG. 5 is a flowchart illustrating the data security method for the mobile communication apparatus according to a preferred embodiment of the invention. The present invention also provides a data security method used in the mobile communication apparatus 10. Please also refer to FIG. 1. The data security method of the present invention is described by referring to the mobile communication apparatus 10 in FIG. 1. According to the present invention, the data security method for the mobile communication apparatus 10 comprises the following steps:

Step 200: A plurality of data security classes are provided and a third security code 66 is stored in the mobile communication apparatus 10.

Step 202: The mobile communication apparatus 10 receives a remote message 68.

Step 204: The mobile communication apparatus 10 examines whether the remote message 68 is a predetermined legitimate remote control message according to the third security code 66. If YES, go to step 206; if NOT, go to step 208.

Step 206: The data in the user's personal database 44 is protected correspondingly according to the remote message 68.

Step 208: End

In some embodiment of the invention, in the following scenario, the original owner loses his/her mobile communication apparatus 10, and the data security class of the lost mobile communication apparatus 10 is set to be Class 2. Then, the original first SIM card 12 of the lost mobile communication apparatus 10 is replaced by the second SIM card 13. The original owner will receive a notice signal 36 first. However, the data in the user's personal database 44 will not be sent back to the original owner since the data security class 2 provides no security action of that data transmission. The original owner can then further send a remote message 68 to the lost mobile communication apparatus 10 to change the data security class to be Class 3. Therefore, the lost mobile communication apparatus 10 will then perform the security action of sending all the data in the user's personal database 44 back to the original owner according to the predetermined contact information. In other words, no matter what the original setting of the security class and the contact information are, the original owner can easily change that via remote control.

Compared with the prior art, the present invention is provided not only to effectively secure/protect the data stored in the mobile communication apparatus when the mobile communication is lost, but also to remotely control the setting of the lost mobile communication apparatus. Besides, when the original SIM card is replaced, user information of the substitute SIM card can be sent to the original owner via various transmission methods so that the original owner can continuously trace and set the lost mobile communication apparatus by using a new communication number provided in that user information. This helps the original owner to find back the lost mobile communication apparatus.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A mobile communication apparatus, comprising:
    an anti-theft control circuit, determining whether the mobile communication apparatus is lost or stolen and comprising:
    an information management module, storing a user's personal database comprising at least one of a phonebook database, a schedule database and an e-mail database; and
    a security module, performing a security action when the mobile communication apparatus is lost or stolen; and
    a transmission control circuit, transmitting data and/or signals;
    wherein when the transmission control circuit receives a remote message and the security module decodes the remote message using a pre-stored security code and determines that the remote message is a predetermined legitimate remote control message, the mobile communication apparatus is determined to be lost or stolen;

wherein when the mobile communication apparatus is lost or stolen, the transmission control circuit transmits a notice message, wherein a currently used SIM card is not owned by an original owner of the mobile communication apparatus and the notice message is for enabling user information corresponding to the currently used SIM card to reach a recipient of the notice message;

wherein the user information corresponding to the currently used SIM card includes a phone number corresponding to the currently used SIM card.

2. The mobile communication apparatus of claim 1, wherein the remote message is generated by an electronic device when the electronic device receives the notice message.

3. The mobile communication apparatus of claim 1, wherein when the remote message is confirmed to be the predetermined legitimate remote control message, the transmission control circuit sends out the at least one record of the phonebook database, the schedule database and the e-mail database according to a predetermined contact information.

4. The mobile communication apparatus of claim 1, wherein the security action comprises a step of locking up and encrypting at least one record of the phonebook database, the schedule database and the e-mail database according to the remote message.

5. The mobile communication apparatus of claim 1, wherein the transmission control circuit sends out at least one record of the phonebook database, the schedule database and the e-mail database when the mobile communication apparatus is determined to be lost or stolen, and deletes the at least one record of the phonebook database, the schedule database and the e-mail database after sending the at least one record of the phonebook database, the schedule database and the e-mail database out.

6. A method for protecting personal data applied in a mobile communication apparatus, comprising:

providing a user's personal database comprising at least one of a phonebook database, a schedule database and an e-mail database, which is stored in the mobile communication apparatus;

getting second identification information from a second SIM card installed within the mobile communication apparatus;

comparing the second identification information with prestored first identification information corresponding to a first SIM card;

determining that the mobile communication apparatus is stolen or lost when the second identification information is different from the first identification information; and when the mobile communication apparatus is stolen or lost, performing either or both of sending out at least a record of the phonebook database, the schedule database and the e-mail database to a predetermined contact information and deleting the at least one record of the phonebook database, the schedule database and the e-mail database, wherein each of the first and second identification information is an Integrated Circuit Card Identification (ICCID), and the ICCID is a number physically printed on a SIM card.

* * * * *